United States Patent
Oliver et al.

(10) Patent No.: US 11,162,761 B2
(45) Date of Patent: Nov. 2, 2021

(54) ADJUSTABLE RIFLE LASER SIGHT

(71) Applicant: Osprey Global, LLC, Cartersville, GA (US)

(72) Inventors: Keith Oliver, Cartersville, GA (US); Zhou Wangxi, Wuhan (CN); Huang Shaqing, Guangzhou (CN)

(*) Notice: Subject to any disclaimer, the term of this patent is extended or adjusted under 35 U.S.C. 154(b) by 363 days.

(21) Appl. No.: 16/402,400

(22) Filed: May 3, 2019

(65) Prior Publication Data
US 2019/0360778 A1    Nov. 28, 2019

Related U.S. Application Data

(60) Provisional application No. 62/666,515, filed on May 3, 2018.

(51) Int. Cl.
*F41G 1/35* (2006.01)
*G02B 27/20* (2006.01)

(52) U.S. Cl.
CPC .............. *F41G 1/35* (2013.01); *G02B 27/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,295,753 B1* | 10/2001 | Thummel | ............... | F41A 33/02 42/116 |
| 6,519,890 B1* | 2/2003 | Otteman | ............... | F41G 1/38 42/122 |
| 9,752,853 B2* | 9/2017 | Teetzel | ............... | F41G 1/36 |
| 2007/0137089 A1* | 6/2007 | William, III | ............... | F41G 1/44 42/122 |
| 2007/0240355 A1* | 10/2007 | Hsu | ............... | F41G 1/35 42/115 |
| 2012/0240446 A1* | 9/2012 | Lee | ............... | F41G 1/30 42/115 |
| 2013/0182739 A1* | 7/2013 | Cheng | ............... | G01C 15/002 372/101 |
| 2013/0276345 A1* | 10/2013 | Hamilton | ............... | F41G 1/38 42/119 |
| 2014/0002815 A1* | 1/2014 | Jaeschke | ............... | G02B 27/36 356/247 |
| 2017/0268851 A1* | 9/2017 | Hamilton | ............... | F41G 1/38 |
| 2017/0341257 A1* | 11/2017 | Teetzel | ............... | F41G 1/30 |
| 2018/0156569 A1* | 6/2018 | Chavez | ............... | F41G 11/003 |

* cited by examiner

*Primary Examiner* — Derrick R Morgan
(74) *Attorney, Agent, or Firm* — Baker Donelson Bearman Caldwell & Berkowitz, PC (57) ABSTRACT

An adjustable laser sight is described to be utilized with a firearm and a select ammunition having a known trajectory. The sight has an outer housing and a movable laser diode. The sight also includes a vertical adjuster for varying the vertical angle of the diode. The vertical adjuster has a turret with a series of detent holes therein which mesh with a spring biased detent. The turret detent holes are unevenly spaced from each other, with the spacing increasing between each successive pair of turret detent holes. Each turret detent hole is associated with a progressively increasing incremental target distance mark on the turret. A first bushing is rotatably coupled to the turret and is rotatably coupled to a second bushing with camming members. The second bushing also has an internally threaded adjustment screw therein for even adjustment of the laser diode.

16 Claims, 6 Drawing Sheets

ADJUSTABLE RIFLE LASER SIGHT

REFERENCE TO RELATED APPLICATION

Applicant claims the benefit of U.S. Provisional Patent Application Ser. No. 62/666,515 filed May 3, 2018 and entitled Adjustable Rifle Laser Sight.

TECHNICAL FIELD

This invention relates to rifle laser sights, and specifically to rifle laser sights which adjust for various distances to a target.

BACKGROUND OF THE INVENTION

It has been well known to provide rifles or pistols with sights to guide the operator in aiming the firearm. High power scopes are often utilized to provide an accurate sight at a select range or distance. The scope is mounted on the top of the firearm to provide a magnified view of the potential target when sighted. Cross hairs within the scope are used to sight the target, with the intersection of the cross hairs being placed exactly on the intended target.

Limitations of the high powered scope include the problem that the scope must be "calibrated" to assure accuracy. Typically, adjusting screws are provided which can be used to adjust the cross hairs so that the scope accurately marking the target. If a rifle, for example, is mounted on a stand and the target sighted in the cross hairs of the scope, minor adjustments of the scope may be necessary to assure accuracy. Adjustments are made by firing a round of ammunition and noting where the round strikes with respect to the target. Mechanical adjustment of the scope can then be made to align the cross hairs of the scope with the actual point at which the round of ammunition struck the target. It may take several attempts of this trial and error firing of the rifle and adjusting the scope to bring the cross hairs in alignment with the actual striking point of the ammunition round. As can be expected, this procedure, even when performed by a skilled marksman, is time consuming and inherently imprecise.

Another problem associated with the sighting of a rifle's scope is the correlation between the scope being a perfectly flat or straight line of sight while the trajectory of a bullet is generally arcuate, as the bullet first rises and then drops as gravity pulls the bullet downwardly. As such, a rifle is typically sighted for one specific distance to the target, for example 100 yards. However, the scope is then not accurately sighted for other distances, for example a target at 200 yards or 300 yards.

To adjust for varying distances to a target, some scopes are fitted with a compensator which has predetermined clicks or increments which move the cross-hairs within the scope. An upward movement of the cross-hairs results in the scope, and therefore the rifle, being angled at a higher angle to compensate for a longer shot to the target. The problem with this solution is that different bullets or ammunition have different flight trajectories due to the differences in the weight of the bullet, the amount of gunpowder used, aerodynamics of the bullet, and the resulting velocity of the bullet. Also, the trajectory or drop of the bullet increases at different distances. For example, a rifle sighted at 100 yards may have a bullet drop of 3.1 inches between 100 yards and 200 yards from the rifle. However, this same bullet may then have a bullet drop of 14.4 inches between the next 100 yards of between 200 yards and 300 yards. This change is a result of the bullet velocity decreasing over time, resulting in larger and larger bullet drops over time and distance.

These problems are similarly prevalent with laser sights which use collimated light laser diode. Again, the light is projected as a straight line while the bullet's arcuate trajectory changes over distance. As such, the laser diode of the laser sight may be adjustable to compensate for varying distances. However, as with the scopes cross-hairs, these laser sights are adjustable in a manner that provides a select vertical distance drop with each "click" of the adjustment feature, for example, it produces an even 3.6 inch drop compensation for each and every "click" regardless of the target distance. As a bullet's trajectory, and therefore drop, changes over time and distance, it is oftentimes very difficult to calculate how many clicks or incremental adjustments must be made to the sight given a target distance.

Accordingly, it is seen that a need remains for a rifle laser sight which is adjustable for different distances to an intended target. Ir is to the provision of such therefore that the present invention is primarily directed.

DETAILED DESCRIPTION

With reference next to the drawings, there is shown an adjustable rifle laser sight 10 in a preferred form of the invention. The rifle laser sight 10 is designed to be utilized within a rifle, gun or firearm, and more particularly a rifle, even though all these terms are to be used interchangeably herein. The rifle laser sight 10 has an outer housing 11 configured to be mounted to the rail of a rifle. The housing 11 has a front wall 12, a top wall 13, a rear wall 14, a right side wall 15, a left side wall 16, and a bottom wall 17 to form an internal chamber 19 therein. The bottom wall 17 includes a conventional adjustable rail mount 18.

The rifle laser sight 10 also includes a light assembly which has a circuit 23, a laser diode 24, lens 25, a battery 26, and interconnecting electrical elements, shown herein as an electrically conductive coil spring 27. The laser diode 24 and lens 25 are mounted to or adjacent the front wall 12 so as to generate and direct a visible light beam VL of collimated light through a front opening 31 in the front wall 12. The coil spring 27 acts as a conductor and is coupled to the circuit 23 so to provide current from the battery 26 to the laser diode 24. The laser diode 24 is mounted to a diode housing 28 which is positioned or oriented within a diode housing chamber 29. The diode housing 28 is biased in both a vertical direction and a horizontal direction by a flat spring 30, or multiple springs, positioned between the diode housing 28 and the diode housing chamber 29 at an approximately 45 degree angle.

The rifle laser sight 10 also includes a horizontal or windage adjuster 35 coupled to the right side wall 15 of the housing 11, for adjusting the side to side or horizontal adjustment of the rifle laser sight 10. The windage adjuster 35 includes a windage knob 36 extending to a threaded windage stem 37 which contacts or engages the diode housing 28. The incremental threaded rotation of the windage knob 36 causes rotation of the windage stem 37 which laterally pushes upon the diode housing 28 against the biasing force of the flat spring 30.

The rifle laser sight 10 also includes a vertical or drop compensator or adjuster 40 coupled to the top wall 13 of the housing 11, for varying the vertical adjustment of the rifle laser sight 10.

Figure 1:
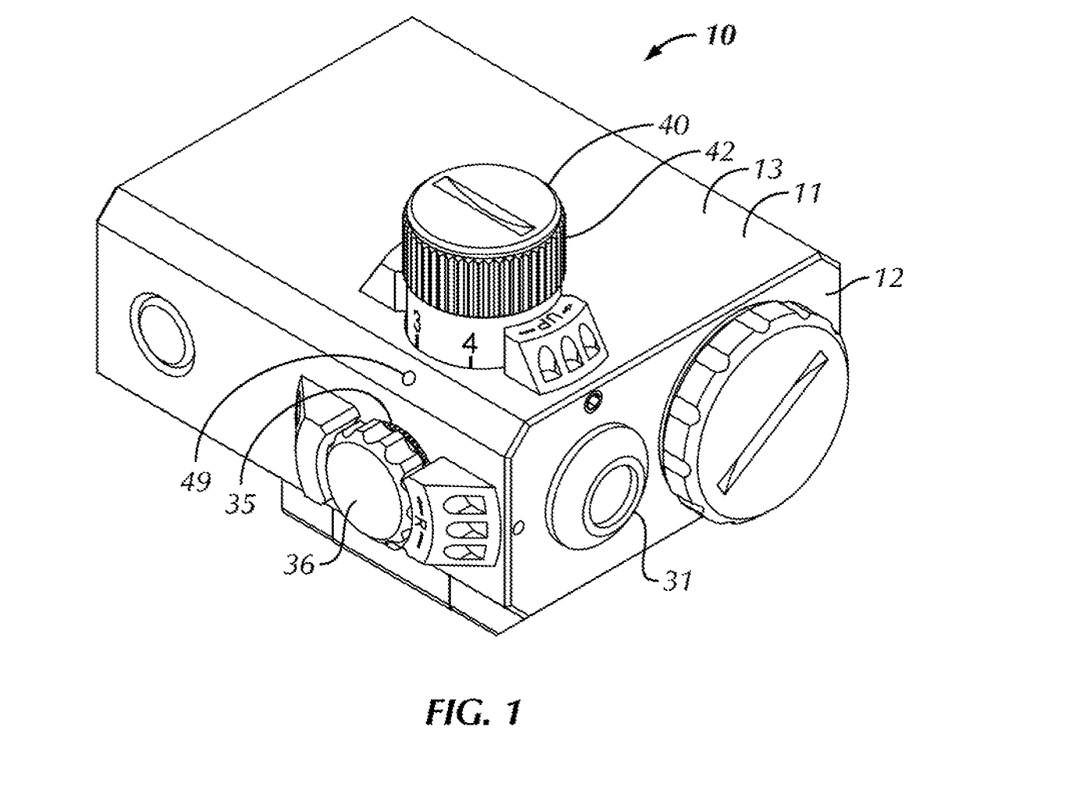
FIG. 1 is a perspective view of an adjustable rifle laser sight embodying principles of the invention in a preferred form.
Figure 2:
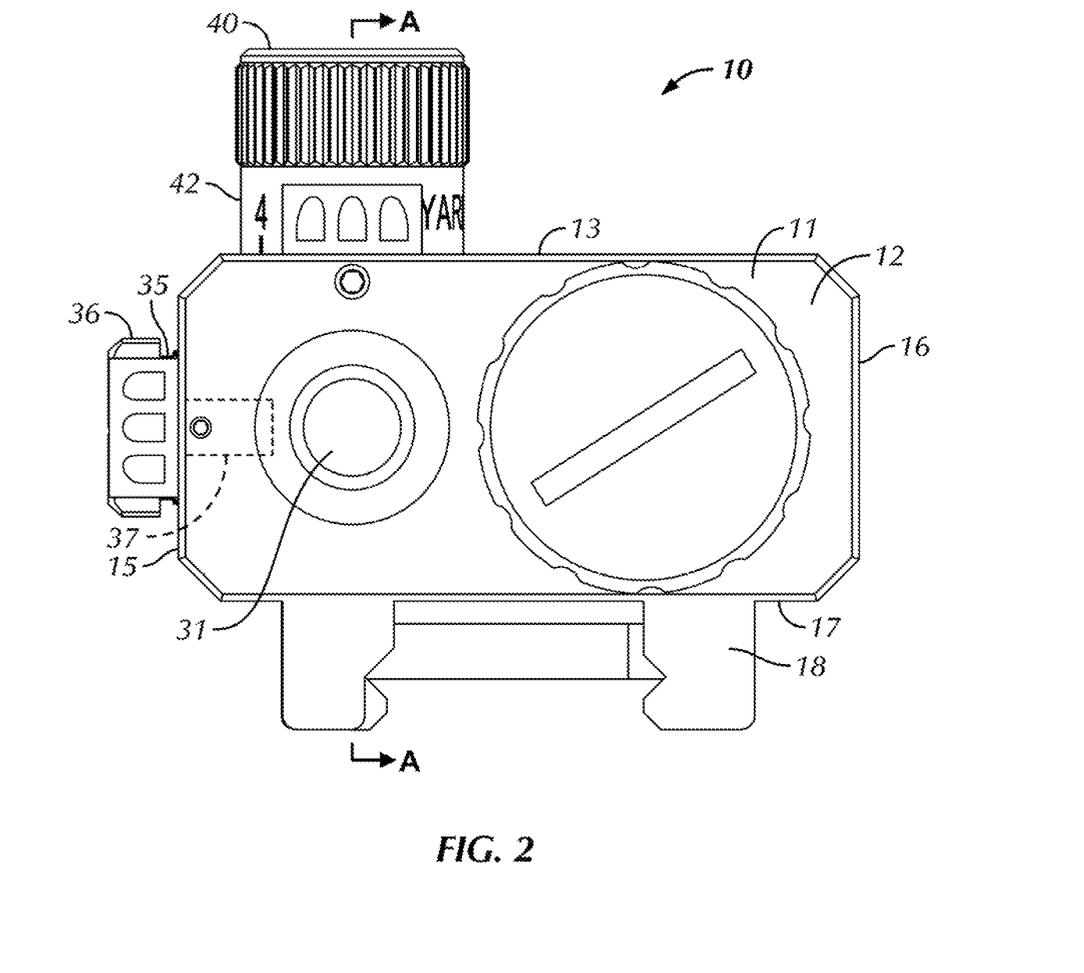
FIG. 2 is a front view of the adjustable rifle laser sight of FIG. 1.
Figure 3:
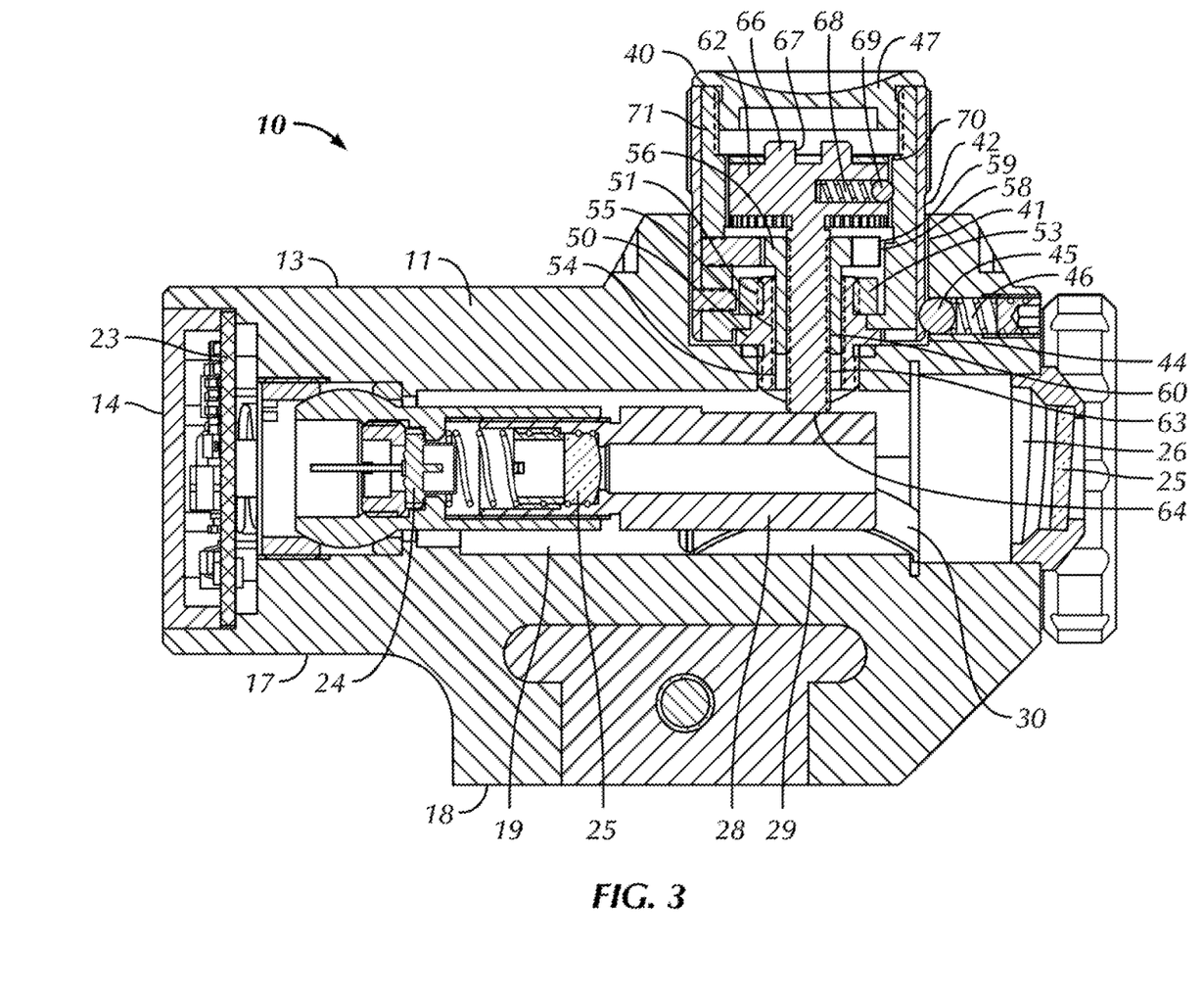
FIG. 3 is a cross-sectional view of the adjustable rifle laser sight of FIG. 1.
Figure 4:
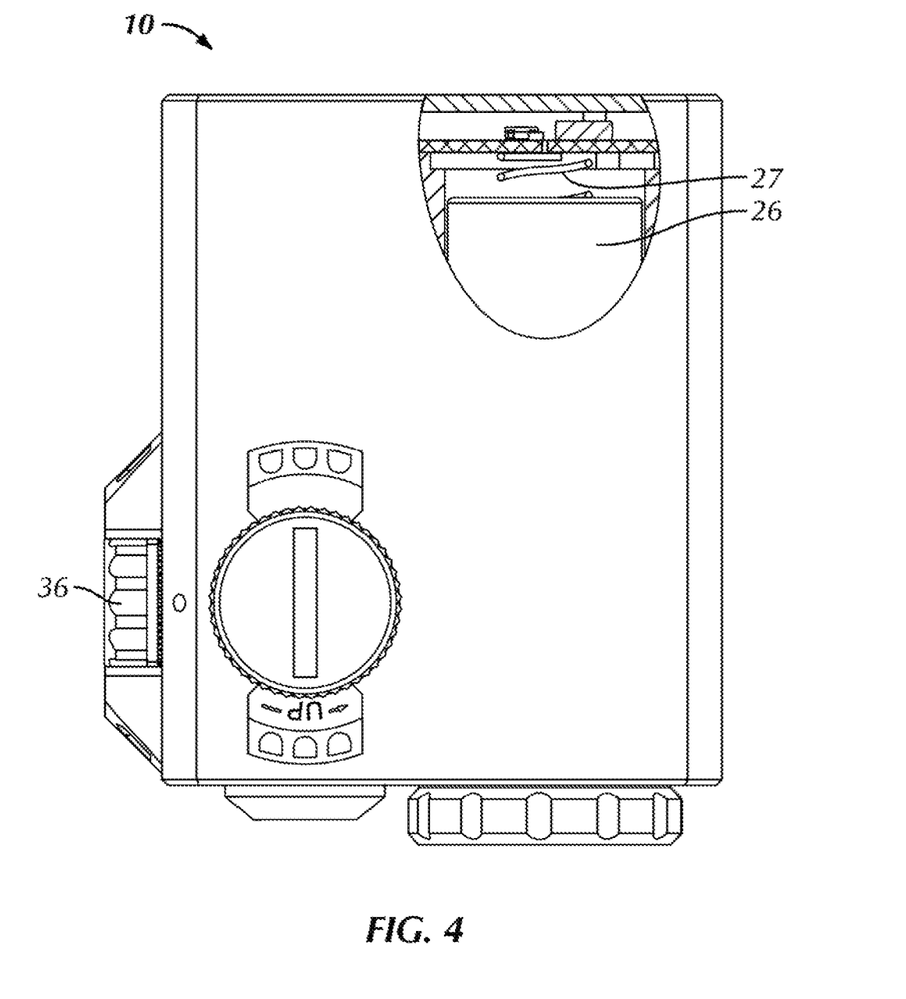
FIG. 4 is a top view of the adjustable rifle laser sight of FIG. 1.
Figure 5:
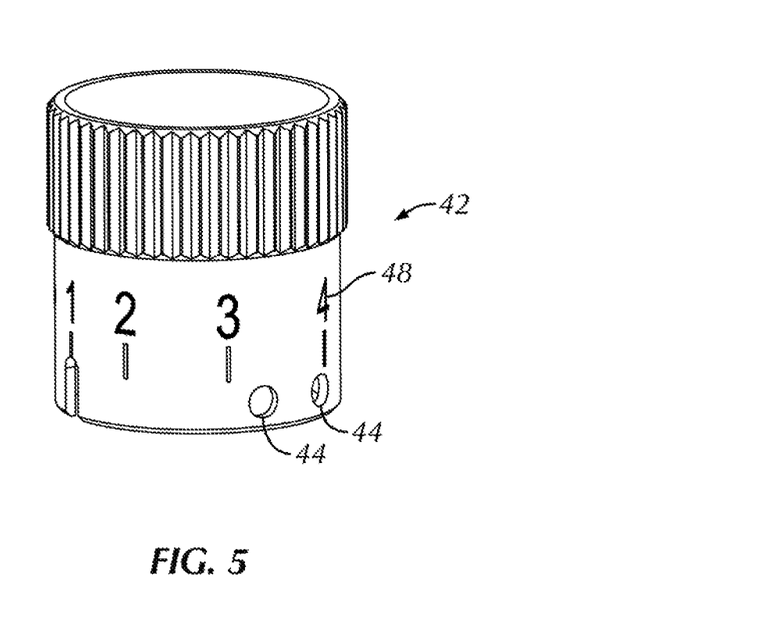
FIG. 5 is a perspective view of turret portion of the adjustable rifle laser sight of FIG. 1.
Figure 6:
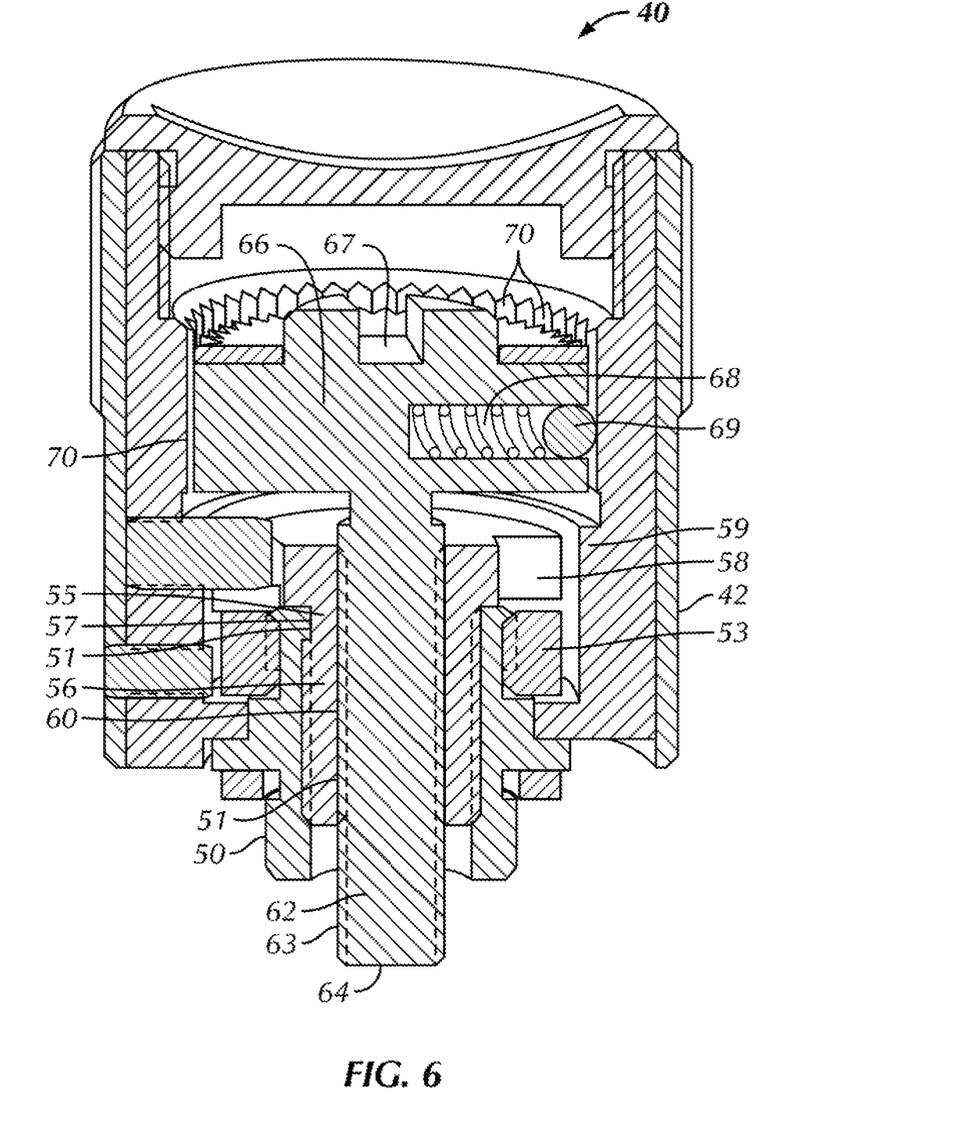
FIG. 6 is a cross-sectional view of the turret portion in another preferred form of the invention.

The vertical compensator 40 includes a turret channel 41 extending through the top wall 13 of the housing 11 to the diode housing chamber 29. A generally cylindrical turret, outer portion, or knob 42 is telescopically and rotatably mounted within the turret channel 41. The turret 42 includes an interior supporting sleeve 71. The turret 42 has a series of detent openings, grooves, indentations, or holes 44 therein which mesh with a spring biased detent or projection 45 extending from the housing front wall 12 through a threaded detent hole 46. The turret channel 41 includes internal threads which mesh with the external threads of a removable turret cap 47 (through threads within support sleeve 71). The turret detent holes 44 are unevenly spaced from each other, with the spacing increasing between each successive pair of turret detent holes, i.e., the space between each turret detent hole increases from the first turret detent hole 44' (coinciding with the target distance mark 48 for 100 yards described hereinafter). Each turret detent hole 44 is associated with a progressively increasing target distance mark 48 inscribed on the outside surface of the turret and alignable with an index mark. The target distance marks 48 are typically 100 yards, 200 yards, 300 yards, 400 yards and 500 yards. The target distance marks 48 are offset from their associated turret detent holes 44 by approximately 90 degrees, as the index mark 49 is offset from the detent 45 by approximately 90 degrees, see FIG. 5.

A first member or bushing 50 is rotatably coupled to the turret 42 for rotational movement therebetween and fixedly coupled to the turret channel 41 to prevent relative movement therebetween. The first bushing 50 has an inwardly extending cam or cam flange 51 (camming element). A mounting ring 53 is coupled to and about the first bushing 50. The first bushing 50 also has an internal, central passage or channel 54 therethrough.

A second member or bushing 56 is mounted within the central channel 54 of the first bushing 50. The second bushing 56 has a stem portion 55 that has an outer surface with a cam following groove 57 (camming element) configured to receive and ride upon the cam flange 51 of the first bushing 50. The second bushing 56 also includes a mounting flange 58 which is received within a corresponding space 59 within the turret 42 to prevent relative vertical movement between the second bushing 56 and the turret 42. The second bushing 56 also has an internally threaded adjustment screw mounting hole, passage or channel 60 therethrough.

An adjustment screw 62 is mounted to the second bushing 56. The adjustment screw 62 includes an externally threaded stem 63 which meshes with the internally threaded adjustment screw mounting hole 60, so that rotational movement of the adjustment screw 62 causes an even vertical movement of the adjustment screw 62 relative to the second bushing 56. The bottom end of the adjustment screw 62 terminates at a contact end 64 which abuts or engages the diode housing 28. The adjustment screw 62 also has a head 66 with the screw head groove 67 and a detent chamber 68 in which is mounted a spring loaded projection or detent 69. The spring loaded detent 69 is configured to mesh with and index upon a radial array of vertically oriented detent grooves 70 within the interior surface of the turret 42.

It should be understood that the rifle laser sight of the present invention is designed for a specific type or caliber, and possibly weight, and gunpowder load of ammunition. The specific configuration of the rifle laser sight 10 is dependent upon the known specific drop associated with each caliber or particular ammunition, as the drop varies between different calibers and even between different bullet weights and gunpowder loads of the same caliber. As described hereinafter, the spacing or configuration of the turret detent holes 44 depends on the specific rifle laser sight associated with a specific caliber and/or caliber and bullet weight, and/or gunpowder load.

As such, the vertical compensator 40 may be considered to have two adjustment portions which include a first, even vertical diode adjuster and a second, uneven vertical diode adjuster, which may work with each other. The adjustment screw 62 and second bushing 56 provides for the first vertical diode adjuster or even vertical diode adjuster, while the first bushing 50 and second bushing 56 provides for an incrementally uneven vertical diode adjuster.

In use, a user simply mounts the specifically selected ammunition rifle laser sight 10 to the sight rail of a rifle, gun or other firearm, collectively referenced herein as any of these terms, using the conventional rail mount 18. Once mounted, the user "sights in" the rifle laser sight 10 for a specific target distance, typically 100 yards. The user sights in the rifle laser sight 10 by aligning the laser light (dot) produced by the laser diode 24 with the target at the given distance and firing the rifle. The rifle laser sight 10 is then adjusted vertically up and down depending upon the bullet's impact position upon the target. The rifle laser sight may also be adjusted horizontally left of right through the horizontal adjuster.

The initial, even vertical adjustment to the first target distance is accomplished by threadably rotating the adjustment screw 62, which causes the adjustment screw 62 to move vertically and evenly relative to the second bushing 56. This also causes the contact end 64 of the adjustment screw 62 to move either further against or retracted from the diode housing 28, thereby causing the diode housing to rock evenly either up or down against the biasing force of the screw 62 and flat spring 30, thereby causing the laser light to move evenly and vertically relative to the target. A clockwise rotation of the adjustment screw 62 causes a downward movement of the adjustment screw so as to push the diode housing 28 downwardly and thus the light downwardly relative to the target. The downward movement of the laser light causes the rifle to be aimed higher upon the target to adjust for a bullet impact which was previously too low upon the target. The user repeats this procedure until the rifle laser sight is correctly adjusted for the target at the sighted in distance (100 yards).

Once the rifle laser sight 10 is correctly sighted to the first distance (100 yards), the rifle laser sight 10 is also correctly sighted for each incremental distance associated with the turret target distance marks 49 for the correlating preselected specific ammunition. As the user rotates the turret 42 from a position wherein the first or initial target distance mark (100 yards) is aligned with the index mark 49 to a position wherein the second target distance mark (200 yards) is aligned with the uneven index mark 49, the second bushing 56 rotates relative to the first bushing 50. This rotational movement causes the cam following groove 57 to ride upon the cam flange 51 of the first bushing, thereby forcing the second bushing 56 downward. The second bushing 56 being threadably coupled to the adjustment screw 62 moves the adjustment screw downward in an uneven manner with each incremental rotation to cause an increase in the distance traveled by the adjustment screw, thereby forcing the contact end 64 to push upon the diode housing 28 downward and the projected laser light from the diode 24 downward relative to the target. The distance of the downward movement of the adjustment screw 62 is calibrated to coincide with that known vertical drop associated with a given caliber, bullet weight, and gunpowder load, or any single attribute or combination thereof. For example, a 55 grain 223 ammunition round is known to have a vertical drop of 3.1 inches between a target distance of 100 yards and 200 yards, i.e., this bullet accurately sighted at 100 yards from the rifle will drop 3.1 inches below the visual sighting at a target distance of 200 yards from the rifle. This bullet will drop 14.4 inches below the 100 yard sighting at a distance of 300 yards. This bullet will also drop 31.7 inches below the 100 yard sighting at as distance of 400 yards. It should be noted that the vertical drop drastically increases with each successive increase in yardage due to the decreasing velocity of the bullet, thus the adjustment provided by the rotation of the turret, and therefore the rotation of the second bushing, is termed an uneven, incremental adjustment.

Thus, the target distance marks 48, and correlating detent holes 44, are calibrated to move the adjustment screw 62 in select uneven and incrementally larger distances to move the laser diode housing 28 (angle of the housing) to compensate for this known bullet distance drops. The vertical movement of the second bushing 56 and adjustment screw 62 between the first target distance mark (100 yards) and the second target distance mark (200 yards) is smaller than the vertical movement of the second bushing and adjustment screw 62 between the second target distance mark (200 yards) and the third target distance mark (300 yards). The increasing vertical movement of the second bushing 56 and adjustment screw 62 between each successive increasing target distance mark 48 (between pairs of sequential marks and their respective detent holes 44) is true with each increasing associated distance.

Accordingly, the vertical movement of the second bushing 56 and adjustment screw 62 is progressively increasing between each incremental movement. This increasing distance between each target distance mark 48 may be achieved by increasing the angle of the cam following groove 67 or by increasing the rotational distance or radial angle between each successive target distance mark 48. As the present example shows increasing distances between successive target distance marks, the cam following groove 67 is set at a constant angle. As an alternative, if the cam following groove 67 varied (progressively increased), the distances between successive target distance marks may be kept constant or the same and the uneven increase is created by the changing slope of the camming elements.

The immediate and essentially automatic compensation for bullet drop enables a user to quickly adjust for varying distances between targets without having to calculate how many "clicks" or uniform adjusting increments must be afforded between two give target distances. For example, if a target moves from approximately 100 yards away to a distance of approximately 200 yards away, the user simply moves the turret to the second target distance mark of 200 yards. If the target then moves to a distance of approximately 300 yards away, the user simply moves the turret to the third target distance mark of 300 yards. This quick and simple method of adjusting for varying distance is a great improvement over the prior art wherein a user must determine that a movement from 100 yards to 200 yards may be one "click" but a distance change from 200 yards to 300 yards may require an additional three "clicks", while a distance change from 300 yards to 400 yards requires an additional 6 "clicks". This assumes that each "click" causes an angular change in the laser diode compensating for a 3.6 inch vertical change at 100 yards. It should also be understood that any type of light may be used in the present invention, inclusive of light which may be within or outside the visible spectrum, such as white light, ultraviolet light, or infrared light. It should be noted however that the use of light outside the visible spectrum would require additional equipment in order to view the light upon the target. As used herein the terms laser, laser diode and laser module are synonymous.

It should also be understood that with the present invention, each incremental increase in the target distance marks 48 may be correlated to any vertical distance change in the light at the target. As such, the adjustment by the rifle laser sight 10 may be exact even though the drop distance varies. This is different from prior art laser sights wherein each increment was a set drop, for example 3.6 inches, which meant that a user must calculate the closest multiple of 3.6 inches to reach an approximate adjustment. A 200 yard shot results in a bullet drop of 3.1 inches, but the incremental adjustment to the prior art laser sight or "click" achieves a sight adjustment of 3.6 inches, meaning that the adjustment is still 0.5 inches off. Other distances may require having to make a choice between two different "clicks", one being too high an adjustment and one being too low an adjustment.

It should also be understood that the rifle laser sight may be easily changed from one specific caliber to another specific caliber by simply changing the turret 42, which would have a different arrangement of the target distance marks 48 and corresponding detent holes 44, i.e., different radial angles between adjacent detent holes 44. The different arrangement of detent holes 44 move the second bushing 56 and adjustment screw 62 to different measured distances or positions which relate to the bullet drop corresponding to that specific caliber, load and weight of ammunition used therewith.

It should be understood that the terms "first" and "second" are used herein to identify select elements, members or portions as they are sequentially identified. As such, the term "first" and "second" may change between the description herein and the description recited in the claims due to the sequential manner in which each relative term is identified, i.e., a "first" member recited in the detailed description may be a "second" member within the claims.

It thus is seen that a laser rifle laser sight is now provided which overcomes problems with those of the prior art. While this invention has been described in detail with particular references to the preferred embodiments thereof, it should be understood that many modifications, additions and deletions, in addition to those expressly recited, may be made thereto without departure from the spirit and scope of the invention as set forth in the following claims.

The invention claimed is:

1. An adjustable firearm laser sight comprising:
   a housing having an internal laser diode channel;
   a laser diode positioned within said internal laser diode channel, said laser diode creating and directing a beam of light from said adjustable firearm laser sight to a target;

a first vertical diode adjuster coupled to said laser diode, said first vertical diode adjuster providing an even biasing adjustment of the position of said laser diode to evenly vary the vertical projection of the beam of light from said laser diode, and a second vertical diode adjuster providing an uneven incremental biasing adjustment of the position of said laser diode to unevenly incrementally vary the vertical projection of the beam of light from said laser diode;

wherein said first vertical diode adjuster includes a first member having a threaded internal channel, and an adjustment screw having a head and an externally threaded stem extending from said head threadably received within said threaded internal channel of said first member and configured to abut said laser diode; and wherein said second vertical diode adjuster includes a second member having an internal passage with a first camming element, and wherein said first member is positioned within said second member internal passage for rotary motion therebetween, and wherein said first member has a second camming element configured to engage said first camming element to cause vertical movement of said first member upon rotational movement of said second member.

2. The adjustable firearm laser sight of claim 1 wherein said second member includes a cylindrical outer portion having a series of detents wherein the distance between each successive pair of detents increases compared to the previous pair of detents.

3. The adjustable firearm laser sight of claim 2 wherein said outer portion series of detents are a series of holes, and wherein said housing includes a spring loaded projection configured to engage said series of holes.

4. The adjustable firearm laser sight of claim 2 wherein said adjustment screw head includes a spring loaded screw detent projection and wherein said cylindrical outer portion has an interior surface with a series of grooves configured to engage said spring loaded screw detent projection.

5. The adjustable firearm laser sight of claim 1 further comprising a horizontal adjuster coupled to said laser diode.

6. An adjustable firearm light sight comprising:
a housing;
a light source coupled to said housing for adjustable movement, said light source creating and directing a beam of light from said adjustable firearm light sight to a target;
an even vertical diode adjuster coupled to said light source to provide an even vertical adjustment of the position of said light source, and
an uneven incremental vertical diode adjuster coupled to said even vertical diode adjuster to provide an uneven incremental adjustment of said even vertical diode adjuster;
wherein said even vertical diode adjuster includes a first member having a threaded internal channel, and an adjustment screw having a head and an externally threaded stem extending from said head threadably received within said threaded internal channel of said first member and configured to abut said light source; and
wherein said uneven incremental vertical diode adjuster includes a second member having an internal passage with a first camming element, and wherein said first member is positioned within said second member internal passage for rotary motion therebetween, and wherein said first member has a second camming element configured to engage said first camming element to cause vertical movement of said first member upon rotational movement of said second member.

7. The adjustable firearm light sight of claim 6 wherein said second member includes a cylindrical outer portion having a series of detents wherein the distance between each successive pair of detents increases compared to the previous pair of detents.

8. The adjustable firearm light sight of claim 7 wherein said outer portion series of detents are a series of holes, and wherein said housing includes a spring loaded projection configured to engage said series of holes.

9. The adjustable firearm light sight of claim 7 wherein said adjustment screw head includes a spring loaded screw detent projection and wherein said cylindrical outer portion has an interior surface with a series of grooves configured to engage said spring loaded screw detent projection.

10. The adjustable firearm light sight of claim 6 further comprising a horizontal adjuster coupled to said light source.

11. The adjustable firearm light sight of claim 6 wherein said light source is a laser diode.

12. An adjustable firearm laser sight for use with a firearm utilizing a preselected ammunition, said adjustable firearm laser sight comprising:
a housing having an internal laser diode channel;
a laser diode positioned within said internal laser diode channel, said laser diode creating and directing a beam of light from said adjustable firearm laser sight to a target;
a first vertical diode adjuster coupled to said laser diode, said first vertical diode adjuster providing an adjustment of the position of said laser diode to vary the vertical projection of the beam of light from said laser diode,
a second vertical diode adjuster providing an uneven incremental adjustment of the position of said laser diode to incrementally vary the vertical projection of the beam of light from said laser diode based upon the known trajectory of a select ammunition used with the firearm;
wherein said first vertical diode adjuster includes a first member having a threaded internal channel, and an adjustment screw having a head and an externally threaded stem extending from said head threadably received within said threaded internal channel of said first member and configured to engage said laser diode; and
wherein said second vertical diode adjuster includes a second member having an internal passage with a first camming element, and wherein said first member is positioned within said second member internal passage for rotary motion therebetween, and wherein said first member has a second camming element configured to engage said first camming element to cause vertical movement of said first member upon rotational movement of said second member.

13. The adjustable firearm laser sight of claim 12 wherein said second member includes a cylindrical outer portion having a series of detents wherein the distance between each successive pair of detents increases compared to the previous pair of detents.

14. The adjustable firearm laser sight of claim 13 wherein said outer portion series of detents are a series of holes, and wherein said housing includes a spring loaded projection configured to engage said series of holes.

15. The adjustable firearm laser sight of claim 13 wherein said adjustment screw head includes a spring loaded screw detent projection and wherein said cylindrical outer portion has an interior surface with a series of grooves configured to engage said spring loaded screw detent projection.

16. The adjustable firearm laser sight of claim 12 further comprising a horizontal adjuster coupled to said laser diode.

\* \* \* \* \*